United States Patent
Brown et al.

(10) Patent No.: US 11,912,935 B2
(45) Date of Patent: Feb. 27, 2024

(54) PROCESS FOR PREVENTION AND REMEDIATION OF SUBTERRANEAN-FORMED METAL-POLYMER COMPLEXES

(71) Applicant: SELECT CHEMISTRY, LLC, Houston, TX (US)

(72) Inventors: Drew K. Brown, Katy, TX (US); Fati Malekahmadi, Houston, TX (US); Yifan Li, Katy, TX (US)

(73) Assignee: SELECT CHEMISTRY, LLC, Houston, TX (US)

( * ) Notice: Subject to any disclaimer, the term of this patent is extended or adjusted under 35 U.S.C. 154(b) by 0 days.

(21) Appl. No.: 17/977,613

(22) Filed: Oct. 31, 2022

(65) Prior Publication Data
US 2023/0073762 A1    Mar. 9, 2023

Related U.S. Application Data

(63) Continuation of application No. 16/995,449, filed on Aug. 17, 2020, now Pat. No. 11,518,928.

(60) Provisional application No. 62/892,934, filed on Aug. 28, 2019.

(51) Int. Cl.
*C09K 8/68* (2006.01)
*C09K 8/88* (2006.01)
*C09K 8/52* (2006.01)

(52) U.S. Cl.
CPC .............. *C09K 8/68* (2013.01); *C09K 8/52* (2013.01); *C09K 8/88* (2013.01)

(58) Field of Classification Search
None
See application file for complete search history.

(56) References Cited

U.S. PATENT DOCUMENTS

| | | | | |
|---|---|---|---|---|
| 3,150,085 A | * | 9/1964 | Mallory | C09K 8/28 507/116 |
| 3,555,006 A | * | 1/1971 | Stofer | C08B 37/0087 536/101 |
| 3,816,306 A | * | 6/1974 | Roy | C02F 9/00 423/43 |
| 4,663,366 A | * | 5/1987 | Drake | C09K 8/50 507/131 |
| 5,219,476 A | * | 6/1993 | Lockhart | C09K 8/512 507/260 |
| 5,244,878 A | * | 9/1993 | Sugier | F17D 1/02 585/866 |
| 7,044,170 B2 | * | 5/2006 | Goodwin | C04B 28/02 427/403 |
| 7,842,741 B2 | * | 11/2010 | Engelhardt | C08K 5/46 524/801 |
| 8,940,667 B2 | * | 1/2015 | Rey | C09K 8/90 166/305.1 |
| 2010/0056403 A1 | * | 3/2010 | Abad | C08J 3/24 507/214 |
| 2014/0024561 A1 | * | 1/2014 | Reddy | C09K 8/467 507/229 |

* cited by examiner

*Primary Examiner* — John J Figueroa
(74) *Attorney, Agent, or Firm* — Ewing & Jones, PLLC

(57) ABSTRACT

A completion/stimulation/production fluid and injection mixture blend is disclosed. The blend may include an aqueous fluid, a polymer system and an injection mixture that includes a polyol, a natural sugar, an artificial sugar, or a combination thereof.

27 Claims, 5 Drawing Sheets

PROCESS FOR PREVENTION AND REMEDIATION OF SUBTERRANEAN-FORMED METAL-POLYMER COMPLEXES

CROSS-REFERENCE TO RELATED APPLICATIONS

This application is a continuation application which claims priority from U.S. utility application Ser. No. 16/995,449, filed Aug. 17, 2020, which itself is a non-provisional application which claims priority from U.S. provisional application No. 62/892,934, filed Aug. 28, 2019, each of which is incorporated by reference herein in its entirety.

FIELD

Embodiments of the present disclosure generally relate to use of certain composition and methods for prevention and remediation of subterranean-formed metal-polymer formed complexes.

BACKGROUND

During hydraulic fracturing, perforations in the casing of a wellbore are formed at targeted zones of the subterranean formation prior to the introduction of a fracturing fluid. The fracturing fluid is pumped through a section of the wellbore. The hydraulic pressure from the fracturing fluid results in a network of fractures in the subterranean formation. Further pumping of fracturing fluid causes the network of fractures to continue to propagate through the subterranean formation. Proppant, typically sand, is then added to the fluid. The proppant is suspended within the fracturing fluid and is carried to the fractures in the subterranean formation so as to keep the fractures open. Once the hydraulic pressure of the fracturing fluid is relieved, the fracture collapses on the proppant within the fracture. The fractures then allow a pathway for the oil, gas and produced water to flow to the surface for recovery and processing.

Typically, the formulation of fracturing fluid used depends on well temperature and fluid design. Conventional fracturing fluids may include polymer systems such as polyacrylamide slickwater, polyacrylamide slickwater-crosslinked, or traditional fracturing fluid polymer systems, for example, guar gum, guar gum+crosslinker, guar derivative, guar derivative crosslinked, carboxy methyl cellulose (CMC), or CMC crosslinked. These polymer systems may crosslink with metals in the fracturing fluid such as zirconium, boron, titanium aluminum, iron, chromium, and hafnium. Unfortunately, the polymer systems may interact with naturally occurring metals within the subterranean formulation in addition to the metals present in the fracturing fluid. These naturally occurring metals may include, for example and without limitation, zirconium, boron, titanium aluminum, iron, chromium, hafnium, calcium, arsenic, antimony, molybdenum, strontium, zinc, iron, manganese, lead, barium, lithium and naturally occurring radioactive material (NORM). These interactions can cause persistent deposition resulting in formation damage in the subterranean formation, decreasing permeability and production of oil and gas from within the formation. This invention outlines new prevention and remediation methods for subterranean formed metal-polymer complexes where the metal source is NOT intentionally introduced into the well at known levels, typically seen with crosslinking agents of the fracturing fluids. This includes the fracturing water source as well as the native subterranean metal sources of unknown concentrations.

SUMMARY

The present disclosure provides for a completion/stimulation/production fluid and injection mixture blend. The blend may include an aqueous fluid, a polymer system and an injection mixture that includes a polyol, a natural sugar, an artificial sugar, or a combination thereof.

BRIEF DESCRIPTION OF DRAWINGS

The present disclosure may be understood from the following detailed description when read with the accompanying figures. It is emphasized that, in accordance with the standard practice in the industry, various features may not be drawn to scale. In fact, the dimensions of the various features may be arbitrarily increased or reduced for clarity of discussion.

DETAILED DESCRIPTION

Figure 1:
FIG. 1 is a photograph of samples of a subterranean-formed metal polymer complex and sorbitol solutions as described in Example 1.

A detailed description will now be provided. The following disclosure includes specific embodiments, versions and examples, but the disclosure is not limited to these embodiments, versions or examples, which are included to enable a person having ordinary skill in the art to make and use the disclosure when the information in this application is combined with available information and technology. In addition, the present disclosure may repeat reference numerals and/or letters in the various examples. This repetition is for the purpose of simplicity and clarity and does not in itself dictate a relationship between the various embodiments and/or configurations discussed.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

In certain embodiments of the present disclosure, an injection mixture including a polyol, a natural and/or artificial simple sugar, a metal salt of a polyol or natural and/or artificial sugars, or a combination thereof is blended with a completion/stimulation/production fluid to remediate and/or retard subterranean-formed metal-polymer complexes in subterranean formations in such treatments as fracturing, post-fracturing treatments (such as remediation), including, but not limited to remediation as shown in Example 1, production, or re-fracturing. In other embodiments, the polyol, a natural and/or artificial simple sugar, a metal salt of a polyol or natural and/or artificial sugars, or a combination thereof is mixed directly with the completion/stimulation/production fluid. As used herein, a completion/stimulation/production fluid may be used in any or all of such treatments.

The completion/stimulation/production fluid may include an aqueous fluid such as water and one or more polymer systems such as polyacrylamide slickwater, polyacrylamide slickwater-crosslinked, or traditional fracturing fluid polymer systems, for example, guar gum, guar gum+crosslinker, guar derivative, guar derivative crosslinked, carboxy methyl cellulose (CMC), or CMC crosslinked. In certain embodiments of the present disclosure, the polymer system may include a polymer, such as a copolymer containing at least two different monomeric units. In other embodiments, the polymer is a homopolymer containing only one type of monomeric unit.

In certain embodiments, the polymer includes component (A) as a monomeric unit. Component (A) is represented by the formula:

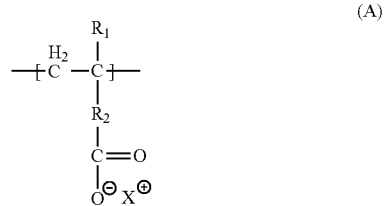

(A)

Within component (A), $R_1$ may be hydrogen, a $C_1$-$C_6$ alkyl, or a phenyl. Within component (A), $R_2$ may be a $C_1$-$C_{22}$ alkylene, a carboxylic $C_1$-$C_{22}$ alkylene ester, benzyl, an alkyl benzyl containing $C_1$-$C_{16}$ carbon atoms, or a benzyl amide. Within component (A), X may be hydrogen, lithium, sodium, potassium, ammonium, or a mixture thereof.

Component (A) may be present in the polymer as a monomeric unit in an amount ranging from about 0.1 to 99.9 weight percent, or 0.5 to 99.5 weight percent, or 1 to 99 weight percent, or 10 to 90 weight percent, or 20 to 80 weight percent, or 30 to 70 weight percent, or 40 to 60 weight percent, or 45 to 55 weight percent based on a total weight of the polymer.

In certain embodiments, the polymer includes component (B) as a monomeric unit. Component (B) is represented by the formula:

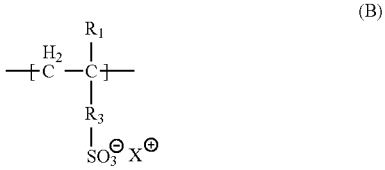

(B)

Within component (B), $R_1$ may be hydrogen, a $C_1$-$C_6$ alkyl, or a phenyl. Within component (B), $R_3$ may be a $C_1$-$C_{22}$ alkylene, a $C_1$-$C_{22}$ alkyl amide, a phenyl amide, a benzyl amide, a carboxylic $C_1$-$C_{22}$ alkylene ester, a phenyl, a benzyl, or a benzyl alkyl containing $C_1$-$C_{16}$ carbon atoms. Within component (B), X may be hydrogen, lithium, sodium, potassium, ammonium, or a mixture thereof.

Component (B) may be present in the polymer as a monomeric unit in an amount ranging from about 0.1 to 99.9 weight percent, or 0.5 to 99.5 weight percent, or 1 to 99 weight percent, or 10 to 90 weight percent, or 20 to 80 weight percent, or 30 to 70 weight percent, or 40 to 60 weight percent, or 45 to 55 weight percent based on a total weight of the polymer.

In certain embodiments, the polymer includes component (C) as a monomeric unit. Component (C) is represented by the formula:

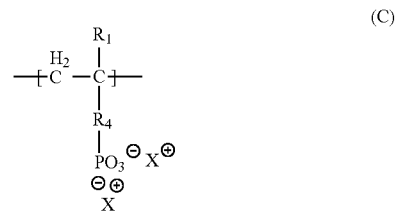

(C)

Within component (C), $R_1$ may be hydrogen, a $C_1$-$C_6$ alkyl, or a phenyl. Within component (C), $R_4$ may be a $C_1$-$C_{22}$ alkylene, a $C_1$-$C_{22}$ alkyl amide, a phenyl amide, a benzyl amide, a carboxylic $C_1$-$C_{22}$ alkylene ester, a phenyl, a benzyl, or a benzyl alkyl containing $C_1$-$C_{16}$ carbon atoms. Within component (C), X may be hydrogen, lithium, sodium, potassium, ammonium or a mixture thereof.

Component (C) may be present in the polymer as a monomeric unit in an amount ranging from about 0.1 to 99.9 weight percent, or 0.5 to 99.5 weight percent, or 1 to 99 weight percent, or 10 to 90 weight percent, or 20 to 80 weight percent, or 30 to 70 weight percent, or 40 to 60 weight percent, or 45 to 55 weight percent based on a total weight of the polymer.

In certain embodiments, the polymer includes component (D) as a monomeric unit. Component (D) is represented by the formula:

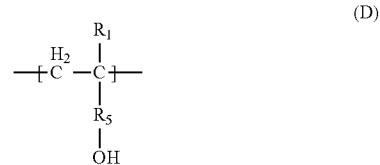

(D)

Within component (D), $R_1$ may be hydrogen, a $C_1$-$C_6$ alkyl, or a phenyl. Within component (D), $R_5$ may be a $C_1$-$C_{22}$ alkylene, a $C_1$-$C_{22}$ alkyl amide, a phenyl amide, a benzyl amide, a carboxylic $C_1$-$C_{22}$ alkylene ester, a benzyl, or a benzyl alkyl containing $C_1$-$C_{16}$ carbon atoms.

Component (D) may be present in the polymer as a monomeric unit in an amount ranging from about 0.1 to 99.9 weight percent, or 0.5 to 99.5 weight percent, or 1 to 99 weight percent, or 10 to 90 weight percent, or 20 to 80 weight percent, or 30 to 70 weight percent, or 40 to 60 weight percent, or 45 to 55 weight percent based on a total weight of the polymer.

In certain embodiments, the polymer includes component (E) as a monomeric unit. Component (E) is represented by the formula:

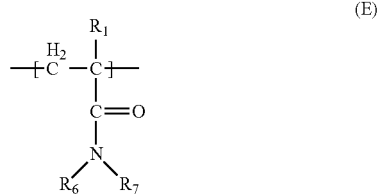

(E)

Within component (E), $R_1$ may be hydrogen, a $C_1$-$C_6$ alkyl, or a phenyl. Within component (E), $R_6$ may be hydrogen or an alkyl containing $C_1$-$C_{22}$ carbon atoms. Within component (E), $R_7$ may be hydrogen or an alkyl containing $C_1$-$C_{22}$ carbon atoms.

Component (E) may be present in the polymer as a monomeric unit in an amount ranging from about 0.1 to 99.9 weight percent, or 0.5 to 99.5 weight percent, or 1 to 99 weight percent, or 10 to 90 weight percent, or 20 to 80 weight percent, or 30 to 70 weight percent, or 40 to 60 weight percent, or 45 to 55 weight percent based on a total weight of the polymer.

In certain embodiments, the polymer includes component (F) as a monomeric unit. Component (F) is represented by the formula:

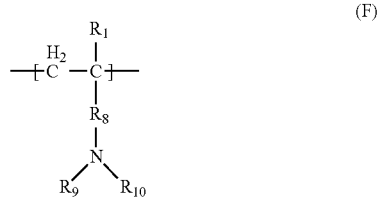

(F)

Within component (F), $R_1$ may be hydrogen, a $C_1$-$C_6$ alkyl, or a phenyl. Within component (F), $R_8$ may be a $C_1$-$C_{22}$ alkylene, a $C_1$-$C_{22}$ alkyl amide, a phenyl amide, a benzyl amide, a benzyl, or a benzyl alkyl containing $C_1$-$C_{16}$ carbon atoms. Within component (F), $R_9$ may be hydrogen or an alkyl containing $C_1$-$C_{22}$ carbon atoms. Within component (F), $R_{10}$ may be hydrogen or an alkyl containing $C_1$-$C_{22}$ carbon atoms.

Component (F) may be present in the polymer as a monomeric unit in an amount ranging from about 0.1 to 99.9 weight percent, or 0.5 to 99.5 weight percent, or 1 to 99 weight percent, or 10 to 90 weight percent, or 20 to 80 weight percent, or 30 to 70 weight percent, or 40 to 60 weight percent, or 45 to 55 weight percent based on a total weight of the polymer.

In certain embodiments, the polymer includes component (G) as a monomeric unit. Component (G) is represented by the formula:

(G)

Within component (G), $R_1$ may be hydrogen, a $C_1$-$C_6$ alkyl, or a phenyl. Within component (G), $R_{11}$ may be a carboxylic acid, a carboxylic salt, a sulfonic acid, a sulfonic salt, a phosphonic acid salt, an alcohol, an amine, or a nitrile. When $R_{11}$ is a carboxylic salt, $R_{11}$ may be, for example and without limitation, a lithium carboxylic salt, sodium carboxylic salt, potassium carboxylic salt, ammonium carboxylic salt, or a mixture thereof. When $R_1$ is a sulfonic salt, $R_1$ may be, for example and without limitation, a lithium sulfonic salt, sodium sulfonic salt, potassium sulfonic salt, ammonium sulfonic salt, or a mixture thereof. When $R_1$ is a phosphonic acid salt, $R_1$ may be, for example and without limitation, a lithium phosphonic acid salt, sodium phosphonic acid salt, potassium phosphonic acid salt, ammonium phosphonic acid salt, or a mixture thereof. When $R_1$ is an amine, $R_1$ may be, for example and without limitation, a primary amine, secondary amine, or tertiary amine.

Component (G) may be present in the polymer as a monomeric unit in an amount ranging from about 0.1 to 99.9 weight percent, or 0.5 to 99.5 weight percent, or 1 to 99 weight percent, or 10 to 90 weight percent, or 20 to 80 weight percent, or 30 to 70 weight percent, or 40 to 60 weight percent, or 45 to 55 weight percent based on a total weight of the polymer.

In certain embodiments, the polymer includes component (H) as a monomeric unit. Component (H) is represented by the formula:

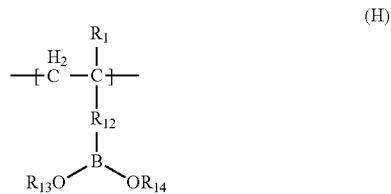

(H)

Within component (H), $R_1$ may be hydrogen, a $C_1$-$C_6$ alkyl, or a phenyl. Within component (H), $R_{12}$ may be a $C_1$-$C_{22}$ alkylene, a $C_1$-$C_{22}$ alkyl amide, a phenyl amide, a phenyl, a phenyl alkylamino amide, or a phenyl alkyl containing $C_1$-$C_{16}$ carbon atoms. Within component (H), $R_{13}$ may be hydrogen, lithium, sodium, potassium, ammonium, or a mixture thereof. Within component (H), $R_{14}$ may be hydrogen, lithium, sodium, potassium, ammonium, or a mixture thereof.

Component (H) may be present in the polymer as a monomeric unit in an amount ranging from about 0.1 to 99.9 weight percent, or 0.5 to 99.5 weight percent, or 1 to 99 weight percent, or 10 to 90 weight percent, or 20 to 80 weight percent, or 30 to 70 weight percent, or 40 to 60 weight percent, or 45 to 55 weight percent based on a total weight of the polymer.

In certain embodiments, the polymer includes component (I) as a monomeric unit. Component (I) is represented by the formula:

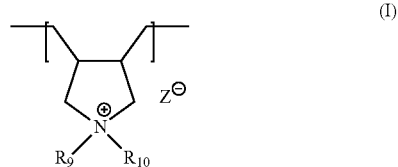

(I)

Within component (I), $R_9$ is hydrogen or an alkyl containing $C_1$-$C_{22}$ carbon atoms; $R_{10}$ is hydrogen or an alkyl containing $C_1$-$C_{22}$ carbon atoms; and Z is chlorine, bromine, iodine, or a mixture thereof.

Component (I) may be present in the polymer as a monomeric unit in an amount ranging from about 0.1 to 99.9 weight percent, or 0.5 to 99.5 weight percent, or 1 to 99 weight percent, or 10 to 90 weight percent, or 20 to 80 weight percent, or 30 to 70 weight percent, or 40 to 60 weight percent, or 45 to 55 weight percent based on a total weight of the polymer.

In certain embodiments, the polymer includes component (J) as a monomeric unit. Component (J) is represented by the formula:

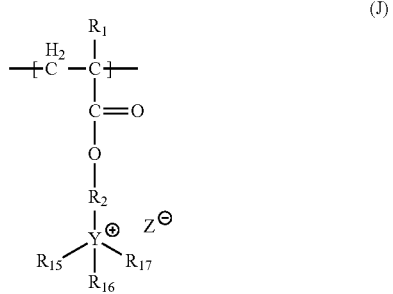

(J)

Within component (J), $R_1$ is hydrogen, a $C_1$-$C_6$ alkyl, or a phenyl; $R_2$ is a $C_1$-$C_{22}$ alkylene, a $C_1$-$C_{22}$ alkyl amide, a phenyl amide, a phenyl, a phenyl alkylamino amide, or a phenyl alkyl containing $C_1$-$C_{16}$ carbon atoms; $R_{15}$ is hydrogen or an alkyl containing $C_1$-$C_{22}$ carbon atoms; $R_{16}$ is hydrogen or an alkyl containing $C_1$-$C_{22}$ carbon atoms; and $R_{17}$ is hydrogen or an alkyl containing $C_1$-$C_{22}$ carbon atoms; Y is nitrogen, phosphorus, sulfur or a mixture thereof; and Z is chlorine, bromine, iodine or a mixture thereof.

Component (J) may be present in the polymer as a monomeric unit in an amount ranging from about 0.1 to 99.9 weight percent, or 0.5 to 99.5 weight percent, or 1 to 99 weight percent, or 10 to 90 weight percent, or 20 to 80 weight percent, or 30 to 70 weight percent, or 40 to 60 weight percent, or 45 to 55 weight percent based on a total weight of the polymer.

As monomeric units, the polymer may include any one of components (A)-(J) or any combinations thereof. In some embodiments, the polymer only includes, as monomeric units, at least one of components (A)-(J) or any combinations thereof and does not include any monomeric units other than components (A)-(J). In certain embodiments, the polymer includes each of components (A)-(J) as monomeric units. In some embodiments, the polymer only includes each of components (A)-(J) as monomeric units and does not include any monomeric units other than components (A)-(J).

Examples of polyols, natural sugars, and artificial sugars for use in the injection mixture include, but are not limited to:

a. Ethylene glycol, glycerol, erythritol, threitol, arabitol, xylitol, ribitol, sorbitol, galactitol, fucitol, inositols, volemitol, isomalt, maltitol, lactitol, maltotritol, maltoetraitol, polyglycitol, glucose, fructose, raffinose, and other related simple sugars;

b. Sugar Alcohols: Arabitol, Erythritol, Fucitol, Galactitol, Hydrogenated starch hydrolysates, Iditol, Isomalt, Lactitol, Lycasin Maltitol, Mannitol, Mannosulfan, Ribitol, Sorbitol, Sorbitex, Threitol, Volemitol, Xylitol;

c. Monosaccharides: Fructose, Galactose, Glucose, Xylose, Dioses, Trioses, Tetroses, Pentoses, Hexoses, Heptoses, Octoses, Nonoses;

d. Disaccharides: Cellobiose, Isomaltose, Isomaltulose, Lactose, Lactulose, Maltose, Sucrose, Trehalose, Turanose;

e. Trisaccharides: Maltotriose Melezitose Raffinose;

f. Tetrasaccharides: Stachyose;

g. Other: Ascorbic acid, Glucuronic acid, Sulfoquinovose, Sialic acid, Glucosamine, Galactosamine, Lactic Acid, polylactic acid;

h. Cyclitol (Cyclic Polyols): Acarviosin, Aminocyclitol, Bornesitol, Ciceritol, Conduritol, Decahydroxycyclopentane, 3-Dehydroshikimic acid, 5-Deoxyinositol, Dodecahydroxycyclohexane, Inositol, Ononitol (4-O-methyl-myo-inositol), Pinitol (3-O-methyl-chiro-inositol), Pinpollitol (di-O-methyl-(+)-chiro-inositol), Quebrachitol (2-O-methyl-chiro-inositol), Quinic acid, Shikimic acid, Validamycin, Valienol, Valienamine, Valienol, Viscumitol, Viscumitol (dimethyl-ether-muco-inositol), Ciceritol, a pinitol digalactoside, Phytic acid, Aminocyclitol;

i. Tetrols: Balsaminol A, Bromopyrogallol red, Citreorosein, Cortobenzolone, Landomycinone, Pentaerythritol, dipentaerythritol, Protopanaxatriol, Tetrahydroxy-1,4-benzoquinone, 2,3,5,7-Tetrahydroxy-1,4-naphthalenedione, Tetrahydroxyanthraquinone. Tetrahydroxyanthraquinones, Pentoses (Apiose, Arabinose, Deoxyribose, L-Deoxyribose, Lyxose, Ribose, Ribulose, Xylose, Xylulose); and j. Metal salts of a-h.

In certain embodiments, the polyol or the natural and/or artificial simple sugar of a-h is encapsulated with a sparingly soluble material, such as with a resin, such as a paraffin or cottonseed oil coating. In such embodiments, the encapsulation is sparingly soluble and may inhibit subterranean formed metal-polymer complexes upon slow dissolution. In other embodiments, the polyol or natural and/or artificial simple sugar is not encapsulated. The polyol, natural and/or artificial simple sugar may be present in the injection mixture in an amount of between 0.1% to 99%, or between 0.1% and 20% by weight of the fluid completion/stimulation/production fluid and injection mixture blend. The injection mixture may also include (amounts based on total weight or volume of the injection mixture): between 1 and 10,000 parts per million (ppm) of a corrosion inhibitor;
between 1 and 10,000 ppm of a biocide;
between 1 and 10,000 ppm of a clay stabilizer;
between 1-10 gallons per ton (gpt) friction reducer, or 1-60 parts per ton (ppt) traditional fracturing fluids;
between 0.1-20 gpt metal crosslinker that is borate, zirconium, aluminum, chromium, titanium, based for crosslinking;
between 3 to 8 lb sand/gallon.

In certain embodiments, the injection mixture and/or completion/stimulation/production fluid and injection mixture blend does not include ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminosulfonic acid (DPAS), ethylenediiminodi(o-hydroxyphenylacetic) acid (EDDHA), glucoheptonic acid, gluconic acid, oxalic acid, malonic acid, succinic acid, glutaric acid, adipic acid, pimelic acid, suberic acid, azelaic acid, sebacic acid, phthalic acid, terephthalic acid, aconitic acid, carballylic acid, trimesic acid, isocitric acid, citric acid, acetic acid, erythorbic acid, formic acid, nitrilotriacetic acid (NTA), phosphonic acid, or salts thereof. In other embodiments, a biocidal quaternary ammonium preservative is not included in the injection mixture and/or completion/stimulation/production fluid and injection mixture blend.

Without being bound by theory, it is believed that the polyols and natural and/or artificial simple sugars interact, such as by binding or chelating, for example, with naturally occurring metals such as zirconium, boron, titanium aluminum, iron, chromium, and hafnium in either the completion/stimulation/production fluid and/or the subterranean heavy metal sources of unknown concentrations, such as zirconium, boron, titanium aluminum, iron, chromium, hafnium, calcium, arsenic, antimony, molybdenum, strontium, zinc, iron, manganese, lead, barium, lithium and naturally occurring radioactive material (NORM), or both to form soluble and sparingly soluble metal complexes. In-situ formation of soluble and sparingly soluble metal complexes downhole that result from this interaction may inhibit subterranean-formed metal-polymer complex formation without encapsulation of the sugars or polyols. The formation of soluble and sparingly soluble metal complexes may retard specific formation damage and may reverse existing formation damage when polymer residues remain in the formation, such as from previous formation treatments. Again, without being bound by theory, it is believed that the polyols and naturals and/or artificial sugars retard iron deposition from naturally occurring iron present in the formation or in the completion/stimulation/production fluid. The complexation reaction with naturally occurring metals may cause the metal-polymer complexes to disperse into solution or dissolve into solution.

The completion/stimulation/production fluid and injection mixture blend may be used in a number of processes, including, but not limited to, initial fracturing, during post-fracturing treatments, or during re-fracturing of the same well. In initial fracturing, post-fracturing, and refracturing of the same well, the completion/stimulation/production fluid and injection mixture blend is used as in initial fracturing, post-fracturing, and refracturing of the same well as if the injection mixture was not present. In another embodiment, when seeking to inhibit the formation of subterranean-formed metal-polymer complexes during post-production treatment, a remediation method includes injecting injection mixture into a subterranean formation next to a well at a pressure below the fracture pressure of the formation to remediate subterranean-formed metal-polymer complexes present. A contact time (1 minute to 100 days or one hour to seven days) is allowed and then the metal-polymer complex remediation mixture is pumped back to the surface after the shut-in of the well.

EXAMPLES

The disclosure having been generally described, the following examples show particular embodiments of the disclosure. It is understood that the example is given by way of illustration and is not intended to limit the specification or the claims. All compositions percentages given in the examples are by weight.

Figure 2:
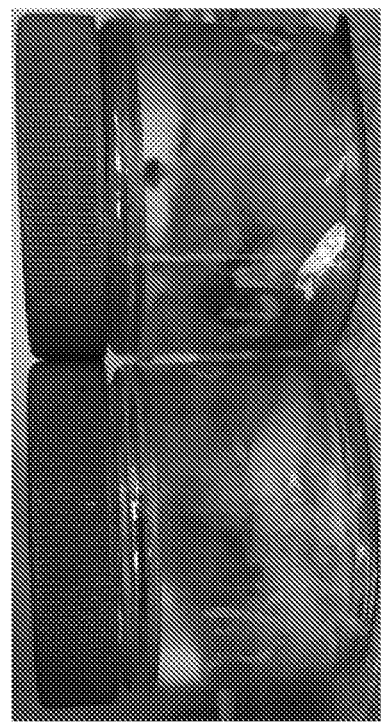
FIG. 2 is a photograph of samples of a subterranean-formed metal polymer complex and sorbitol solutions as described in Example 1.
Figure 3:
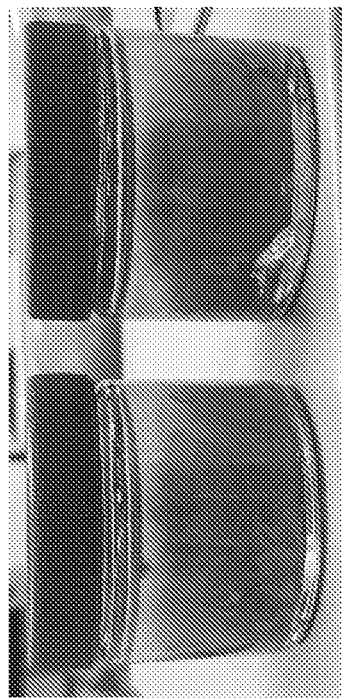
FIG. 3 is a photograph of samples of a subterranean-formed metal polymer complex and sorbitol solutions as described in Example 1.
Figure 4:
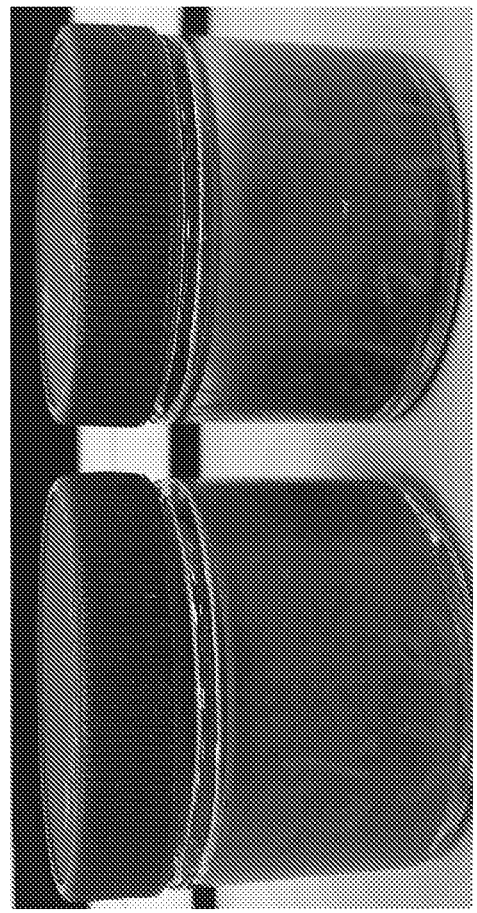
FIG. 4 is a photograph of samples of a subterranean-formed metal polymer complex and sorbitol solutions as described in Example 1.

Example 1—In Example 1, a two gram sample of a subterranean-formed metal polymer complex including metals of unknown concentrations were mixed with a 2% solution and 4% solution (50 mL each) of sorbitol (Sigma Aldrich) at 100° F. as shown in FIG. 1. The pH ranged between 7.4 to 8.4 prior to the complex's addition to the injection mixture. After 3 hours, the solids began to swell noticeably as shown in FIG. 2. After 69 hours, the samples were even more swelled (approximately 80%) and well dispersed as shown in FIG. 3. As shown in FIG. 4, after 5 days at 100° F., both remediation mixtures dispersed nearly 100% of the subterranean-formed metal polymer complex. The sorbitol solutions removed naturally occurring subterranean metals not intentionally added from the polymer residue that remained in the subterranean formation after fracturing. The more swelled and dispersed character of the metal-polymer complexes allows those complexes to be more easily removed and solubilized by the flow of the formation water to the surface. Any remaining dispersed material may be removed at the surface separators.

Example 2—In Example 2, aqueous solutions of 10% citric acid, 70% sorbitol, 10% glucose, 10% EDTA Na5 and 4% pentaerythritol were prepared. The 70% sorbitol solution was prepared using 60 grams of deionized water and 140 grams of sorbitol from Sigma Aldrich. The sorbitol was added in small equal portions while using an overhead mixer. A small amount of heat was necessary to completely solubilize and prepare the stable final solution. The 10% glucose solution was prepared using 20 grams of d(+) glucose from Sigma Aldrich and 180 ml of deionized water in a 250 mL beaker. The 4% pentaerythritol solution was prepared using 192 grams of deionized water and pentaerythritol from Sigma Aldrich. The solution produced was slightly hazy and required a small amount of heat for clarity. The 40% EDTA Na5 from Dow Chemical was diluted. The solutions were combined with samples of a subterranean-formed metal polymer complex including metals of unknown concentrations and then maintained at 150° F. for 24 hours. The results are show in Table 1.

TABLE 1

| | Subterranean-formed metal polymer complex, grams | Remediation Solution | 24 Hour Observation |
|---|---|---|---|
| Blank | 1.87 g | DI Water | 100% undissolved, but is swelling, minor amount of discoloration to solution |
| Sample 1 | 2.08 g | 10% EDTA Na5 | 80-90% in Solution, Some Remains at the bottom glass |
| Sample 2 | 1.81 g | 10% Citric Acid | Completely Solubilized |
| Sample 3 | 1.87 g | 10% Sorbitol | 70-80% in Solution, very swollen |
| Sample 4 | 2.16 g | 70% Sorbitol | 100% undissolved, Very little swelling - too high of concentration |
| Sample 5 | 2.19 g | 10% Glucose | 100% undissolved, but is swelling, minor amount of discoloration to solution |
| Sample 6 | 2.07 g | 4% Pentaerythritol | 100% undissolved, but is swelling, minor amount of discoloration to solution |

As shown in Example 2, the 10% sorbitol solution (sample 3) outperformed all other samples.

Figure 5:
FIG. 5 is a photograph of a series of samples of mixtures of an iron solution and various compositions as described in Example 3.

Example 3—In Example 3, for a known 50 ppm Iron (from $FeCl_2$ tetrahydrate) in deionized water, 70% sorbitol was compared to 10% citric acid and 40% EDTA Na5 neutralized to pH 7 either with BAS-0186 or HCl. After centrifugation (2000 rpm, 5 min), as shown in FIG. 5, sorbitol 70% is comparable to 10% citric acid and 40% EDTA Na5 (basic) to control iron from precipitating.

CT1: Blank pH adjusted to 7;

CT2: 1 gpt 70% sorbitol, pH adjusted to 7;
CT3: Blank pH adjusted to 7;
CT4: 4 gpt 70% sorbitol, pH adjusted to 7;
CT5: 4 gpt 10% citric acid, pH adjusted to 7;
CT6: 4 gpt 40% EDTA Na5l, pH adjusted to 7 with HCl. CT6 showed no solid after centrifugation if pH was unadjusted.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed is:

1. A completion/stimulation/production fluid and injection mixture blend comprising:
an aqueous fluid,
a polymer system, wherein the polymer system includes:
a polymer comprising monomeric units, wherein the monomeric units comprise:
component (B) represented by the formula:

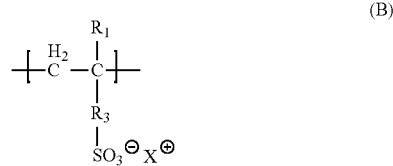

(B)

wherein within component (B), $R_1$ is hydrogen, a $C_1$-$C_6$ alkyl, or a phenyl; $R_3$ is a $C_1$-$C_{22}$ alkylene, a $C_1$-$C_{22}$ alkyl amide, a phenyl amide, a benzyl amide, a carboxylic $C_1$-$C_{22}$ alkylene ester, a phenyl, a benzyl, or a benzyl alkyl containing $C_1$-$C_{16}$ carbon atoms; and X is hydrogen, lithium, sodium, potassium, ammonium or a mixture thereof;
an injection mixture comprising a polyol, a natural sugar, and artificial sugar, or a combination thereof.

2. The completion/stimulation/production fluid and injection mixture blend of claim 1, wherein the polymer system is polyacrylamide slickwater, polyacrylamide slickwater-crosslinked, guar gum, guar gum and crosslinker, guar derivative, guar derivative crosslinked, carboxy methyl cellulose (CMC), or CMC crosslinked.

3. The completion/stimulation/production fluid and injection mixture blend of claim 1, wherein the polyol, natural sugar or artificial sugar is ethylene glycol, glycerol, erythritol, threitol, arabitol, xylitol, ribitol, sorbitol, galacitol, fucitol, inositols, volemitol, isomalt, maltitol, lactitol, maltotritol, maltoetraitol, polyglycitol, glucose, fructose, raffinose, a combination thereof, or a metal salt thereof.

4. The completion/stimulation/production fluid and injection mixture blend of claim 1, wherein the polyol, natural sugar or artificial sugar is Arabitol, Erythritol, Fucitol, Galactitol, Hydrogenated starch hydrolysates, Iditol, Isomalt, Lactitol, Lycasin Maltitol, Mannitol, Mannosulfan, Ribitol, Sorbitol, Sorbitex, Threitol, Volemitol, Xylitol, combinations thereof, or a metal salt thereof.

5. The completion/stimulation/production fluid and injection mixture blend of claim 1, wherein the polyol, natural sugar or artificial sugar is Fructose, Galactose, Glucose, Xylose, Dioses, Trioses, Tetroses, Pentoses, Hexoses, Heptoses, Octoses, Nonoses, combinations thereof, or a metal salt thereof.

6. The completion/stimulation/production fluid and injection mixture blend of claim 1, wherein the polyol, natural sugar or artificial sugar is a disaccharide or a metal salt thereof.

7. The completion/stimulation/production fluid and injection mixture blend of claim 1, wherein the polyol, natural sugar or artificial sugar is Ascorbic acid, Glucuronic acid, Sulfoquinovose, Sialic acid, Glucosamine, Galactosamine, Lactic Acid, polylactic acid, combinations thereof, or a metal salt thereof.

8. The completion/stimulation/production fluid and injection mixture blend of claim 1, wherein the polyol, natural sugar or artificial sugar is cyclitol or a metal salt thereof.

9. The completion/stimulation/production fluid and injection mixture blend of claim 1, wherein the polyol, natural sugar or artificial sugar is tetrol.

10. The completion/stimulation/production fluid and injection mixture blend of claim 1, wherein the polyol, natural sugar or artificial sugar is encapsulated with a sparingly soluble material.

11. The completion/stimulation/production fluid and injection mixture blend of claim 1, wherein the polyol, natural sugar or artificial sugar is present in the injection mixture in an amount of between 0.1% to 99% by weight of the completion/stimulation/production fluid and injection mixture blend.

12. The completion/stimulation/production fluid and injection mixture of claim 1, wherein the injection mixture comprises a corrosion inhibitor, a biocide, a clay stabilizer, a friction reducer, a metal crosslinker that is borate, zirconium, aluminum, chromium, titanium, sand, or a combination thereof.

13. The completion/stimulation/production fluid and injection mixture of claim 1, wherein the completion/stimulation/production fluid and injection mixture does not include ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, oxalic acid, malonic acid, succinic acid, glutaric acid, adipic acid, pimelic acid, suberic acid, azelaic acid, sebacic acid, phthalic acid, terephthalic acid, aconitic acid, carballylic acid, trimesic acid, isocitric acid, citric acid, acetic acid, erythorbic acid, formic acid, nitrilotriacetic acid (NTA), phosphonic acid, or salts thereof.

14. The completion/stimulation/production fluid and injection mixture of claim 1, wherein the completion/stimulation/production fluid and injection mixture does not include a biocidal quaternary ammonium preservative.

15. A composition comprising:
an aqueous fluid;
a polymer system, the polymer system including a polymer comprising monomeric units, wherein the monomeric units comprise:
component (B) represented by the formula:

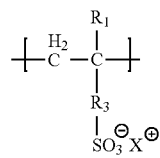

wherein within component (B), $R_1$ is hydrogen, a $C_1$-$C_6$ alkyl, or a phenyl; $R_3$ is a $C_1$-$C_{22}$ alkylene, a $C_1$-$C_{22}$ alkyl amide, a phenyl amide, a benzyl amide, a carboxylic $C_1$-$C_{22}$ alkylene ester, a phenyl, a benzyl, or a benzyl alkyl containing $C_1$-$C_{16}$ carbon atoms; and X is hydrogen, lithium, sodium, potassium, ammonium or a mixture thereof;

and a polyol, a natural sugar, an artificial sugar, or a combination thereof.

16. The composition of claim 15, wherein the polymer system is polyacrylamide slickwater, polyacrylamide slickwater-crosslinked, guar gum, guar gum and crosslinker, guar derivative, guar derivative crosslinked, carboxy methyl cellulose (CMC), or CMC crosslinked.

17. The composition of claim 15, wherein the polyol, natural sugar or artificial sugar is ethylene glycol, glycerol, erythritol, threitol, arabitol, xylitol, ribitol, sorbitol, galacitol, fucitol, inositols, volemitol, isomalt, maltitol, lactitol, maltotritol, maltoetraitol, polyglycitol, glucose, fructose, raffinose, a combination thereof, or a metal salt thereof.

18. The composition of claim 15, wherein the polyol, natural sugar or artificial sugar is Arabitol, Erythritol, Fucitol, Galactitol, Hydrogenated starch hydrolysates, Iditol, Isomalt, Lactitol, Lycasin Maltitol, Mannitol, Mannosulfan, Ribitol, Sorbitol, Sorbitex, Threitol, Volemitol, Xylitol, combinations thereof, or a metal salt thereof.

19. The composition of claim 15, wherein the polyol, natural sugar or artificial sugar is Fructose, Galactose, Glucose, Xylose, Dioses, Trioses, Tetroses, Pentoses, Hexoses, Heptoses, Octoses, Nonoses, combinations thereof, or a metal salt thereof.

20. The composition of claim 15, wherein the polyol, natural sugar or artificial sugar is a disaccharide or a metal salt thereof.

21. The composition of claim 15, wherein the polyol, natural sugar or artificial sugar is Ascorbic acid, Glucuronic acid, Sulfoquinovose, Sialic acid, Glucosamine, Galactosamine, Lactic Acid, polylactic acid, combinations thereof, or a metal salt thereof.

22. The composition of claim 15, wherein the polyol, natural sugar or artificial sugar is cyclitol or a metal salt thereof.

23. The composition of claim 15, wherein the polyol, natural sugar or artificial sugar is tetrol.

24. The composition of claim 15, wherein the polyol, natural sugar or artificial sugar is encapsulated with a sparingly soluble material.

25. The composition of claim 15, wherein the composition comprises a corrosion inhibitor, a biocide, a clay stabilizer, a friction reducer, a metal crosslinker that is borate, zirconium, aluminum, chromium, titanium, sand, or a combination thereof.

26. The composition of claim 15, wherein the composition does not include ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, oxalic acid, malonic acid, succinic acid, glutaric acid, adipic acid, pimelic acid, suberic acid, azelaic acid, sebacic acid, phthalic acid, terephthalic acid, aconitic acid, carballylic acid, trimesic acid, isocitric acid, citric acid, acetic acid, erythorbic acid, formic acid, nitrilotriacetic acid (NTA), phosphonic acid, or salts thereof.

27. The composition of claim 15, wherein the composition does not include a biocidal quaternary ammonium preservative.

* * * * *

UNITED STATES PATENT AND TRADEMARK OFFICE
CERTIFICATE OF CORRECTION

PATENT NO. : 11,912,935 B2
APPLICATION NO. : 17/977613
DATED : February 27, 2024
INVENTOR(S) : Brown et al.

It is certified that error appears in the above-identified patent and that said Letters Patent is hereby corrected as shown below:

In the Claims

Claim 1, Column 11, Line 49:
"and artificial sugar, or a combination thereof."
Should read:
"an artificial sugar, or a combination thereof."

Signed and Sealed this
Twenty-third Day of April, 2024

Katherine Kelly Vidal
*Director of the United States Patent and Trademark Office*